(12) United States Patent
Frashure et al.

(10) Patent No.: US 8,731,795 B2
(45) Date of Patent: May 20, 2014

(54) SYSTEM AND METHOD FOR REDUCING BRAKE FADE

(75) Inventors: Timothy J. Frashure, Columbia Station, OH (US); Richard J. Conklin, Bay Village, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 603 days.

(21) Appl. No.: 12/902,727

(22) Filed: Oct. 12, 2010

(65) Prior Publication Data

US 2012/0089313 A1    Apr. 12, 2012

(51) Int. Cl.
*B60T 17/22* (2006.01)
*B60T 13/66* (2006.01)
*B60T 7/12* (2006.01)

(52) U.S. Cl.
USPC .............. 701/94; 701/95; 701/48; 903/947; 180/244

(58) Field of Classification Search
USPC ........... 701/94–96, 48; 477/92, 107; 303/121, 303/177, 155; 903/947; 180/170, 244
See application file for complete search history.

(56) References Cited

U.S. PATENT DOCUMENTS

| | | | |
|---|---|---|---|
| 2,800,980 A | | 7/1957 | Flockhart |
| 5,213,398 A | | 5/1993 | Becker |
| 5,287,773 A | * | 2/1994 | Nakawaki et al. .............. 477/92 |
| 5,423,601 A | | 6/1995 | Sigl |
| 5,613,744 A | | 3/1997 | Eslinger et al. |
| 5,984,435 A | | 11/1999 | Tsukamoto et al. |
| 5,997,108 A | | 12/1999 | Claussen et al. |
| 6,206,490 B1 | * | 3/2001 | Tozu et al. ..................... 303/168 |
| 6,259,985 B1 | | 7/2001 | Sielagoski et al. |
| 6,304,808 B1 | | 10/2001 | Milot |
| 6,349,253 B1 | | 2/2002 | Bellinger |
| 6,428,120 B1 | * | 8/2002 | Holl ............................. 303/191 |
| 6,460,941 B1 | * | 10/2002 | Zenzen et al. ........... 303/122.03 |
| 6,485,113 B2 | | 11/2002 | Riley et al. |
| 6,813,562 B2 | | 11/2004 | Altan et al. |

(Continued)

FOREIGN PATENT DOCUMENTS

| | | |
|---|---|---|
| DE | 112005000272 T5 | 1/2007 |
| DE | 102005051668 A1 | 5/2007 |
| DE | 102011115128 A * | 12/2013 |

OTHER PUBLICATIONS

Intelligent Transportation Systems: Roadway Applications; Samad, T.; Perspectives in Control Engineering Technologies, Applications, and New Directions; Topic(s): Robotics & Control Systems; Digital Object Identifier: 10.1109/9780470545485.ch14 pp. 348-369; Copyright Year: 2001.*

(Continued)

*Primary Examiner* — Cuong H Nguyen
(74) *Attorney, Agent, or Firm* — Calfee, Halter & Griswold LLP

(57) ABSTRACT

A vehicle braking control system includes a vehicle brake associated with a wheel on the vehicle. A pedal activated by an operator of the vehicle controls application of the brake. An electronic control unit determines a grade mode of the vehicle and controls application of the brake independent of the operator activating the pedal while in an automatic braking mode. The electronic control unit sends a control signal to apply the brake in a manner to reduce brake fade while controlling a speed of the vehicle when the electronic control unit is in the automatic braking mode and the vehicle is in a downhill grade mode.

18 Claims, 3 Drawing Sheets

(56) References Cited

U.S. PATENT DOCUMENTS

| | | | |
|---|---|---|---|
| 6,856,906 B2 | 2/2005 | Winner et al. | |
| 6,962,396 B2 | 11/2005 | Faye et al. | |
| 6,984,005 B2 | 1/2006 | Meyer et al. | |
| 7,765,859 B2* | 8/2010 | Connell et al. | 73/121 |
| 2004/0262994 A1* | 12/2004 | Baumann et al. | 303/155 |
| 2005/0218718 A1* | 10/2005 | Iwatsuki et al. | 303/177 |
| 2008/0140274 A1* | 6/2008 | Jeon et al. | 701/22 |
| 2009/0096280 A1* | 4/2009 | Yamanao et al. | 303/11 |
| 2009/0255329 A1* | 10/2009 | Connell et al. | 73/121 |
| 2010/0125399 A1 | 5/2010 | Grolle | |
| 2010/0222978 A1* | 9/2010 | Kodama et al. | 701/70 |
| 2010/0299036 A1* | 11/2010 | Vespasien | 701/70 |
| 2011/0270500 A1* | 11/2011 | Ummer et al. | 701/70 |
| 2012/0089313 A1* | 4/2012 | Frashure et al. | 701/94 |

OTHER PUBLICATIONS

IEEE Draft Guide for the Calculation of Braking Distances for Rail Transit Vehicles; IEEE Unapproved Draft Std P1698/D1.3, Feb. 2008; Topic(s): Signal Processing & Analysis ; Transportation; Publication Year: 2008.*

Automatic pre-crash collision avoidance in cars; Ferrara, A.; Intelligent Vehicles Symposium, 2004 IEEE; Topic(s): Computing & Processing (Hardware/Software) ; Transportation; Digital Object Identifier: 10.1109/IVS.2004.1336369 Publication Year: 2004 , pp. 133-138.*

System optimization in the control of heavy duty vehicle braking sub-systems; Haijun Fang et al.; Decision and Control, 2009 held jointly with the 2009 28th Chinese Control Conference. CDC/CCC 2009. Proceedings of the 48th IEEE Conf. on; Computing & Processing (Hardware/Software) ; Power, Energy, & Industry App.; Year: 2009 , pp. 3563-3568.*

A distributed control system for an automatic mechanical transmission of a fuel cell city bus; Liangfei Xu ; Jianqiu Li ; Minggao Ouyang ; Yiming Hao; Vehicle Power and Propulsion Conference (VPPC), 2012 IEEE; Digital Object Identifier: 10.1109/VPPC.2012.6422508; Publication Year: 2012 , pp. 1170-1175.*

An Introduction to Regenerative Braking of Electric Vehicles as Anti-Lock Braking System;Tur, O. ; Ustun, O. ; Tuncay, R.N. Intelligent Vehicles Symposium, 2007 IEEE; Digital Object Identifier: 10.1109/IVS.2007.4290238 Publication Year: 2007 , pp. 944-948.*

ABS and active suspension control via high order sliding modes and linear geometric methods for disturbance rejection; Sanchez-Torres, J.D. et al.; Electrical Engineering Computing Science and Automatic Control (CCE), 2011 8th Inter Conf on; Dig Obj Id 10.1109/ICEEE.2011.6106573, Publication Year: 2011 , pp. 1-6.*

The study of the wheeled anti-lock hydraulic brake; Junxia Li ; Ziming Kou; Computer and Automation Engineering (ICCAE), 2010 the 2nd International Conference on; vol. 3; Digital Object Identifier: 10.1109/ICCAE.2010.5452036 Publication Year: 2010 , pp. 97-99.*

Bendix Wingman ACB (Active Cruise with Braking) Service Data Sheet, SD-13/3333, BW2774 (Jan. 2010).

Commercial Driver's Manual (Commonwealth of Pennsylvania), Section 5, Publication 223, Section 5 (Sep. 2006).

Office Action dated Aug. 3, 2012 for counterpart German Patent Appln. No. 10 2011 115 128.5.

* cited by examiner

SYSTEM AND METHOD FOR REDUCING BRAKE FADE

BACKGROUND

The present invention relates to an automatic braking system. It finds particular application in conjunction with controlling how an automatic cruise control system applies service brakes during downhill conditions and will be described with particular reference thereto. It will be appreciated, however, that the invention is also amenable to other applications.

For example, an automatic cruise control (ACC) system, in addition to conventional engine based speed control, typically allows for automated application of the vehicle service brakes to maintain either a constant speed or following distance. When a vehicle is traveling downhill and/or following another vehicle (e.g., a forward vehicle), the ACC system may actively decelerate the vehicle by de-throttling the engine, applying the engine retarder (engine brake), and/or applying the vehicle brakes to maintain the vehicle following distance (to the forward vehicle) and speed. If the forward vehicle accelerates away from the ACC vehicle, the system will attempt to accelerate and maintain a set distance behind the forward vehicle until the set speed is achieved. Prolonged application of the service brake by, for example, the ACC system during a downhill following mode may overwork the service brakes and lead to brake fade. Brake fade is caused by a buildup of heat in the braking surfaces, which may lead to reduced friction against the braking surfaces. In order to avoid brake fade, some ACC systems are designed to disengage when the service brakes become close to a brake fade condition.

The present invention provides a new and improved apparatus and method which addresses the above-referenced problems.

SUMMARY

In one aspect of the present invention, a vehicle braking control system includes a vehicle brake associated with a wheel on the vehicle. A pedal activated by an operator of the vehicle controls application of the brake. An electronic control unit determines a grade mode of the vehicle and controls application of the brake independent of the operator activating the pedal while in an automatic braking mode. The electronic control unit sends a control signal to apply the brake in a manner to reduce brake fade while controlling a speed of the vehicle when the electronic control unit is in the automatic braking mode and the vehicle is in a downhill grade mode.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF ILLUSTRATED EMBODIMENT

Figure 1:
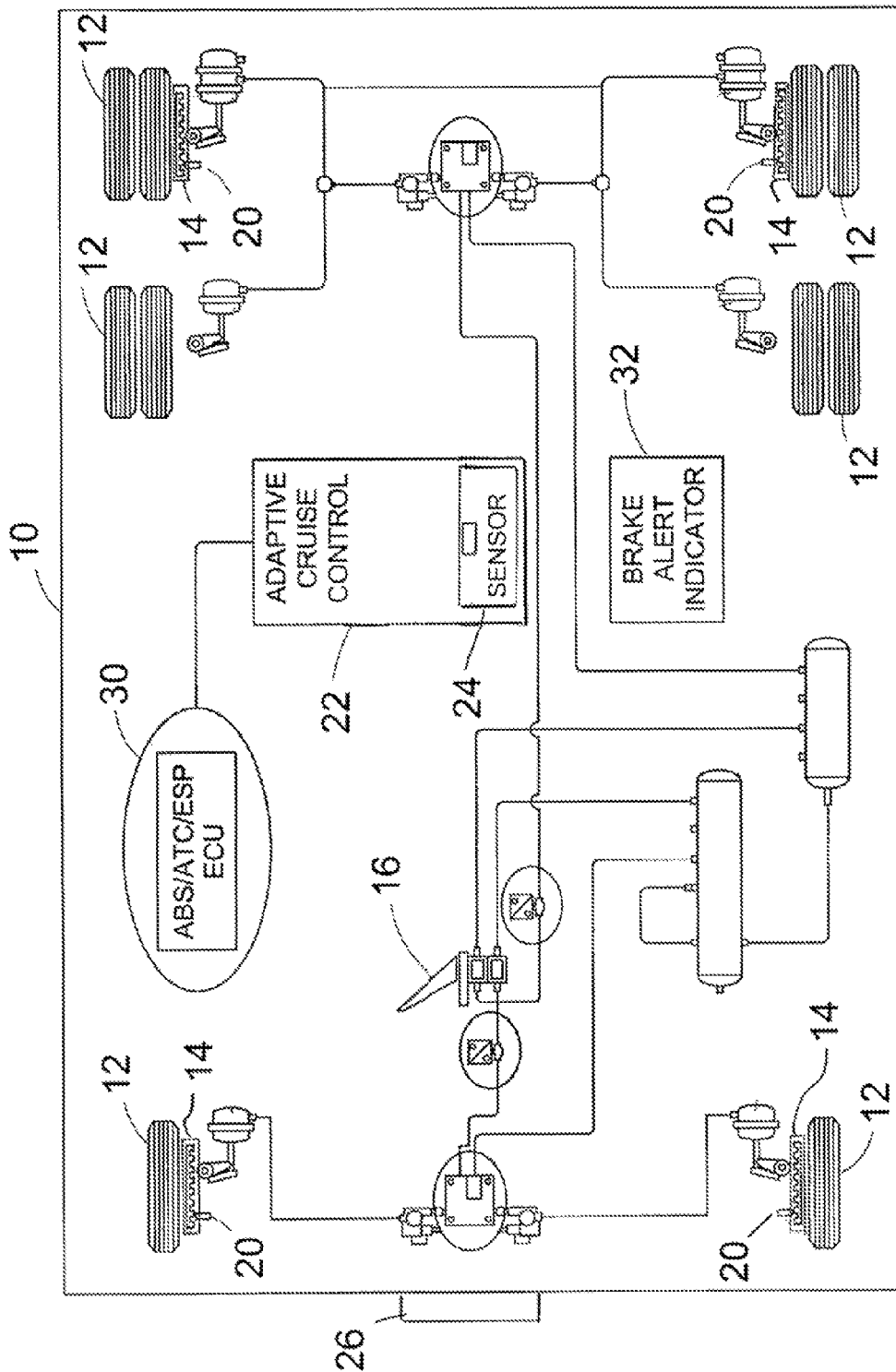
FIG. 1 illustrates a schematic representation of a vehicle including an electronic control unit and an automatic cruise control system in accordance with one embodiment of an apparatus illustrating principles of the present invention.

With reference to FIG. 1, a simplified component diagram of an exemplary vehicle 10 (e.g., a driven vehicle) is illustrated in accordance with one embodiment of the present invention. In one embodiment, the vehicle is a heavy vehicle such as a truck or bus. The vehicle 10 includes wheels 12 and associated respective vehicle brakes 14 (e.g., service brakes). A vehicle brake pedal 16 is used by an operator for manually applying the vehicle brakes 14. Brake temperature sensors 20 measure temperatures of the respective service brakes 14. Alternatively, it is also contemplated to infer temperatures of the respective service brakes 14 by monitoring pressure build and exhaust cycles of the service brakes 14. An automatic (adaptive) cruise control system 22 (e.g., an automatic cruise controller), which may include a sensor 24 that can provide information indicative of road grade (e.g., Bendix YAS60 yaw rate/lateral acceleration sensor), and a forward vehicle sensor 26 (e.g., a radar based sensor that may be located on the front of the vehicle), controls a speed of the vehicle 10.

An electronic control unit 30 (ECU), which electrically communicates with the adaptive cruise control system 22, controls application of the vehicle brakes 14 (e.g., independent of an operator activating the brake pedal 16) as part of, for example, an antilock braking system (ABS), an automatic traction control (ATC) system, and/or an electronic stability program system. In one embodiment, the cruise control system 22 includes control logic, electrically communicating with the ECU 30, that controls the vehicle speed as a function of an acceleration of the vehicle, a distance to a forward vehicle, and a closing distance between the forward vehicle and the vehicle 10. It is to be understood the control logic of the cruise control system 22 may either be part of, or separate from, the ECU 30. As discussed in more detail below, the control logic acts as a means for reducing brake fade of the service brakes 14. A driver alert or brake warning indicator 32 (e.g., a visual indicator such as a dash light and/or an audible indicator such as a buzzer) is discussed in more detail below.

Generally, radar-based automatic cruise control (ACC) systems "track" moving vehicles in the same direction and different lanes as well as oncoming vehicles. Such ACC systems "lock" onto a single forward vehicle moving in the same lane and direction and uses that vehicle as the reference for speed and distance control. If the forward vehicle's speed falls below the ACC vehicle's set speed, the system will de-throttle the engine, progressively apply the engine retarder, and then apply the service brakes in an attempt to maintain a set distance behind the forward vehicle. If the forward vehicle changes lanes away from the ACC vehicle, the system will attempt to "lock" onto another forward vehicle moving in the same lane and direction and that is within the tracking distance range. When there are no other vehicles moving in same lane and direction to lock onto and follow, the system will transition back to the engine cruise control. If the ACC vehicle is following a forward vehicle downhill, the service brakes of the ACC vehicle may be applied in a manner (e.g., a prolonged application of the service brakes) that results in brake fade.

The forward vehicle sensor 26, which is typically mounted on the front of a vehicle, detects whether a "forward" vehicle is present and transmits a signal to the electronic control unit 30, based on a distance to the forward vehicle. If a forward vehicle is present, the electronic control unit 30 determines a forward distance and/or a lateral (sideways) distance to the forward vehicle relative to the driven vehicle. A speed of the forward vehicle (relative to the driven vehicle 10) is determined based on multiple measurements of the forward and lateral distances. An acceleration of the forward vehicle (relative to the driven vehicle 10) is determined based on multiple measurements (over time) of the speed of the forward vehicle. The forward electronic control unit 30 determines whether the forward vehicle is within a predetermined distance (e.g., ~3.5 seconds to the forward vehicle) in front of/to the side of the vehicle 10 as a function of the speed and/or an acceleration of the forward vehicle. Therefore, the predetermined distance changes based on the relative speeds and/or accelerations of the driven vehicle 10 and the forward vehicle. In that regard, the predetermined distance may be considered as a time gap between the driven vehicle 10 and the forward vehicle or as a following time of the driven vehicle 10 behind the forward vehicle.

The sensor 24 transmits a signal to the electronic control unit 30, based on a longitudinal decline (e.g., a pitch) of the vehicle 10. For example, when the vehicle 10 is travelling on a relatively flat road, the longitudinal decline of the vehicle 10 will be ~0° (e.g., the pitch of the vehicle 10 will be relatively flat (e.g., about zero (0°))). If the vehicle 10 is travelling uphill, the longitudinal decline of the vehicle 10 will be >~0° (e.g., the front of the vehicle 10 will be higher than the rear of the vehicle 10). If the vehicle 10 is travelling downhill, the longitudinal decline of the vehicle 10 will be <~0° (e.g., the front of the vehicle 10 will be lower than the rear of the vehicle 10). The signal transmitted from the sensor 24 (or other sensors on the engine or the vehicle, such as wheel speed sensors or an engine throttle position sensor) to the electronic control unit 30 indicates the longitudinal decline of the vehicle 10. The electronic control unit 30 determines the vehicle 10 is in an uphill grade mode (and the electronic control unit 30 itself may be set to an uphill grade mode) when the longitudinal decline of the vehicle 10 is ≥~1° for about 30 seconds. The electronic control unit 30 determines the vehicle 10 is in a downhill grade mode (and the electronic control unit 30 itself may be set to a downhill grade mode) when the longitudinal decline of the vehicle 10 is ≤~-1° for about 30 seconds. It is contemplated that the sensor 24 may be an internal sensor to the automatic cruise control system 22, a yaw rate sensor, or any other type of vehicle grade sensor.

Figure 2:
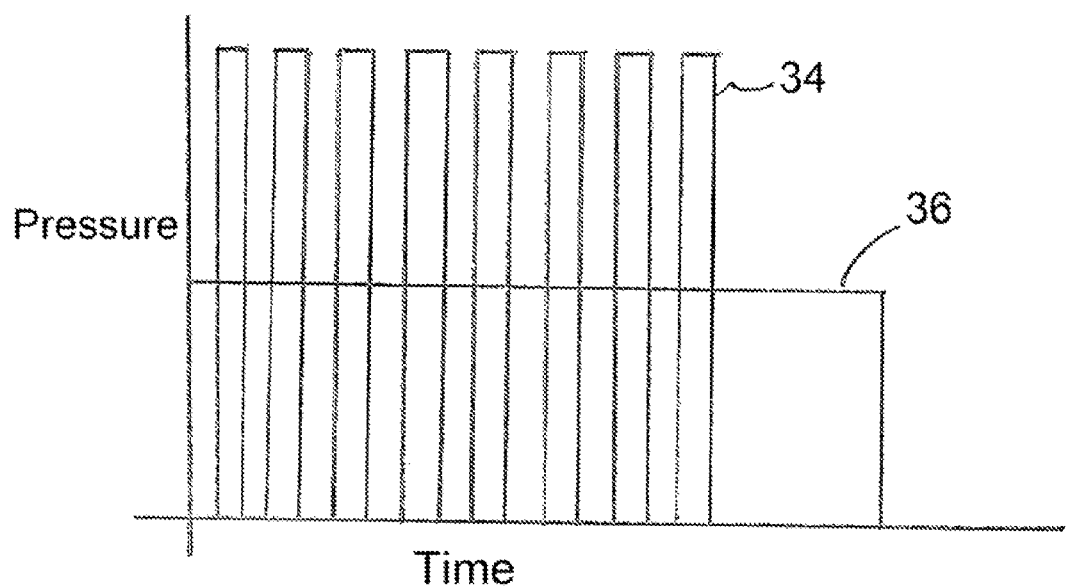
FIG. 2 illustrates a graph of pressure vs. time for brake snubbing compared with continuous braking.

The electronic control unit 30 sends a control signal to apply the service brakes 14 in a manner to reduce brake fade while controlling a speed of the vehicle 10 when both the automatic cruise control system is active (e.g., the electronic control unit is in an automatic braking mode) and while the electronic control unit 30 determines the vehicle is in the downhill grade mode. With reference to FIG. 2, in one embodiment, the brake fade is reduced by applying the service brakes 14 in a plurality of shorter and in higher pressure applications (see curve 34) relative to a continuous application (see curve 36) (e.g., the service brakes are alternately applied for about one-half (½) the normal continuous time at about double the normal continuous pressure). In other words, the brake fade is reduced by snubbing the service brakes 14. For example, the electronic control unit 30 alternately sends a control signal to apply the service brakes 14 for about one-half (½) second to about 10 seconds and then releases the service brakes 14 for about 1½ seconds to about 10 seconds for slowing the vehicle (e.g., by about 5 mph). In this embodiment, it is contemplated that the electronic control unit 30 no longer applies the service brakes 14 in the manner to reduce brake fade once the vehicle 10 is no longer in the downhill grade mode.

In one embodiment, it is contemplated that the electronic control unit 30 sends a control signal to apply the service brakes 14 in the manner to reduce brake fade while controlling a speed of the vehicle 10 when the automatic cruise control system is active (e.g., the electronic control unit is in an automatic braking mode), while the vehicle 10 is in the downhill grade mode, and when the electronic control unit 30 determines a forward vehicle is present. For example, the electronic control unit 30 will send a control signal to apply the service brakes 14 in the manner to reduce brake fade while controlling a speed of the vehicle 10 to maintain a predetermined distance to the forward vehicle. In this embodiment, it is contemplated that the electronic control unit 30 stops sending the control signal (or, alternatively, sends a new control signal) to no longer apply the service brakes 14 in the manner to reduce brake fade once the vehicle 10 is no longer in the downhill grade mode and/or the electronic control unit 30 determines the forward vehicle is greater than the predetermined distance in front of the vehicle 10.

In another embodiment, the electronic control unit 30 sends a control signal to apply the service brakes 14 in the manner to reduce brake fade while controlling a speed of the vehicle 10 when the automatic cruise control system is active (e.g., the electronic control unit is in an automatic braking mode), while the vehicle 10 is in the downhill grade mode, and when the electronic control unit 30 receives an acceleration request of ≤about −1.2 m/sec² (i.e., a deceleration request of ≥about 1.2 m/sec²) from the automatic cruise control system. A deceleration request from the electronic control unit 30 is also referred to as an automated braking request (ABR). It is contemplated that when the electronic control unit 30 receives acceleration requests >about −1.2 m/sec² (e.g., about −0.8 m/sec²), the electronic control unit 30 sends a control signal to cause the vehicle 10 engine retarder to be applied for achieving the requested deceleration. Once the electronic control unit 30 receives an acceleration request ≤about −1.2 m/sec², the electronic control unit 30 sends a control signal to apply the service brakes 14 in the manner to reduce brake fade.

In another embodiment, the electronic control unit 30 sends a control signal to apply the service brakes 14 in the manner to reduce brake fade while controlling a speed of the vehicle 10 when the automatic cruise control system is active (e.g., the electronic control unit is in an automatic braking mode), while the vehicle 10 is in the downhill grade mode, and when the electronic control unit 30 receives a signal from the brake temperature sensor 20 indicating that a temperature of the service brake 14 is above a first predetermined threshold (e.g., about 267° F.).

Once the electronic control unit 30 sends a control signal to apply the service brakes 14 in the manner discussed above to reduce brake fade because the temperature of the service brake 14 is above the first predetermined threshold, in one embodiment the electronic control unit 30 continues to send a control signal to apply the service brakes 14 in the manner discussed above to reduce brake fade until the temperature of the service brake 14 is above a brake overuse threshold (e.g., about 400° F.), which is higher than the first predetermined threshold. Alternatively, if the automatic cruise control system 22 does not remain active, the electronic control unit 30 will stop sending the control signal (or, alternatively, send a new control signal) to stop causing the service brakes 14 to be applied. In this case, the operator of the vehicle 10 may be warned, via the brake warning indicator 32, that neither the electronic control unit 30 nor the automatic cruise control system 22 is controlling application of the service brakes 14.

Figure 3:
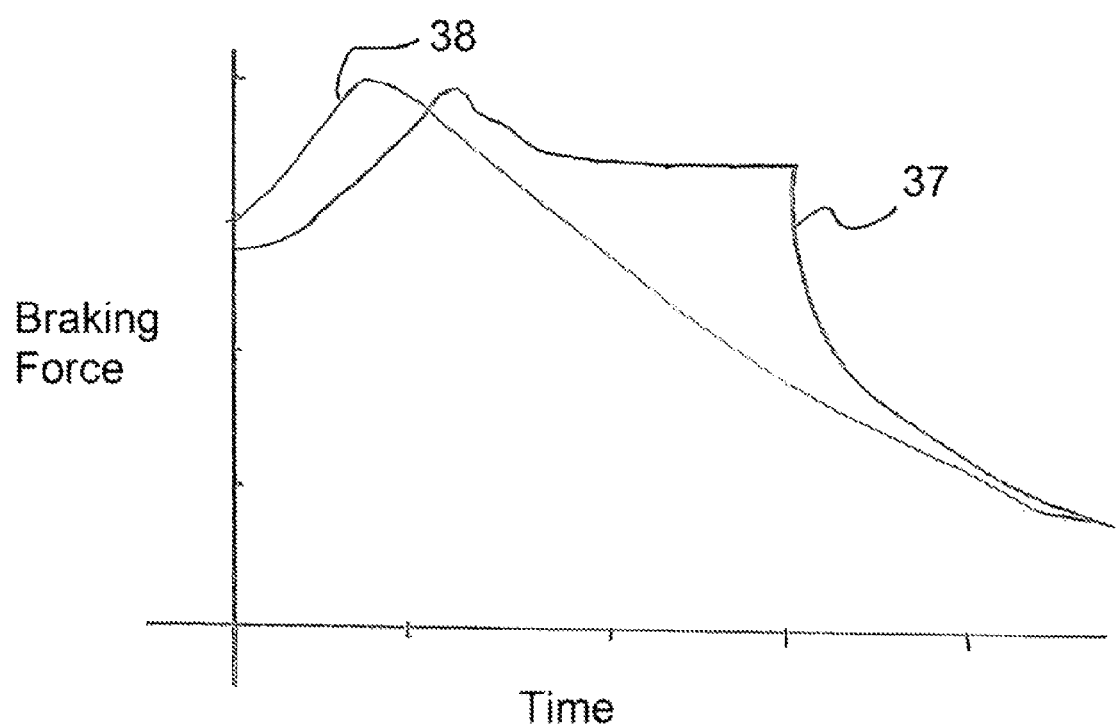
FIG. 3 illustrates a graph of braking force vs. time for brake snubbing compared with continuous braking.

With reference to FIG. 3, in one embodiment higher braking force is maintained by snubbing the service brakes 14 (see curve 37), as compared with continuous braking (see curve 38).

Figure 4:
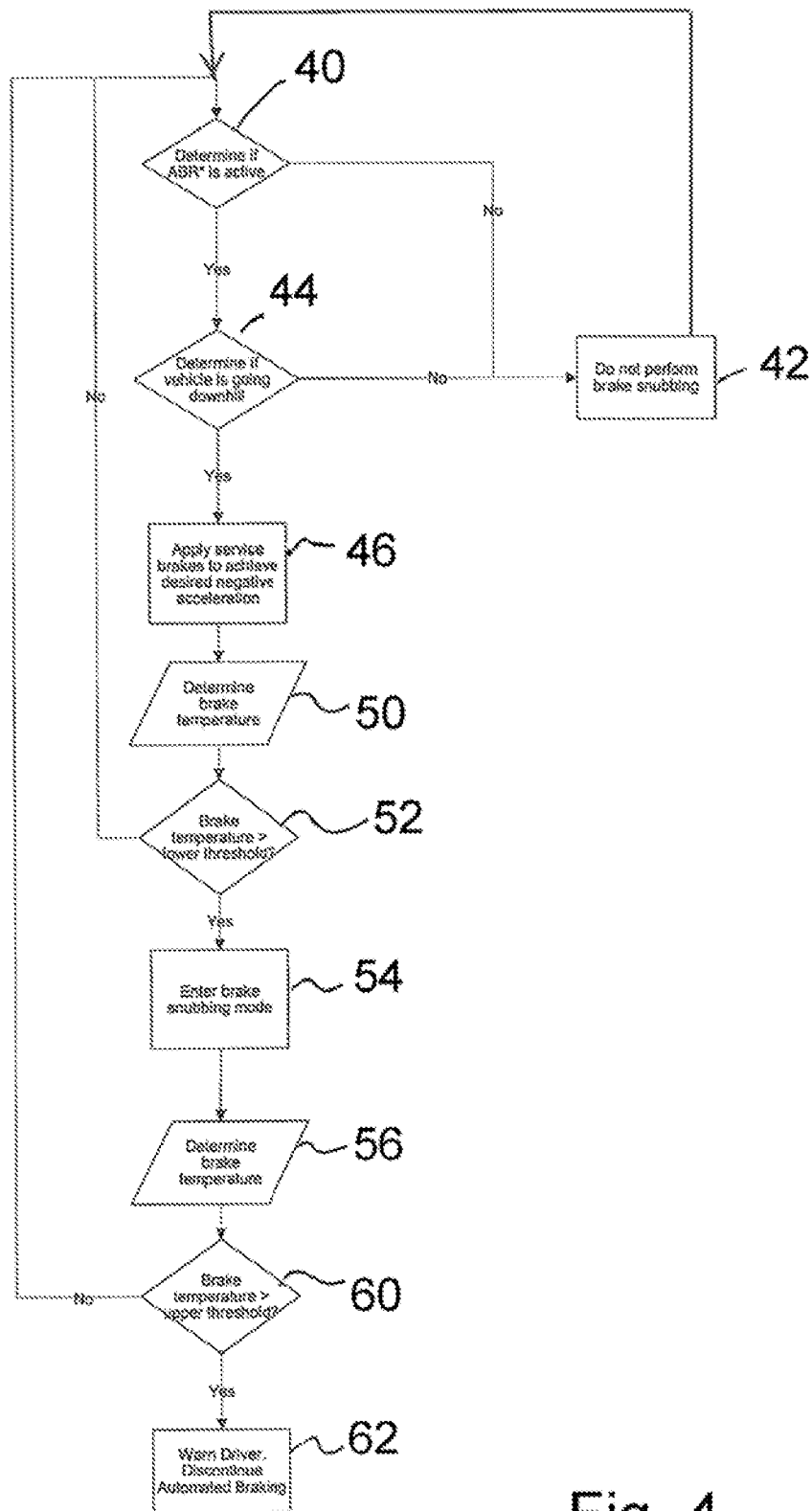
FIG. 4 illustrates a flowchart for an operation of the braking system.

With reference to FIGS. 1 and 4, a determination is made in a step 40 whether an ABR is currently active in the electronic control unit 30. If no ABR is currently active, control passes to a step 42 to indicate no snubbing of the service brakes 14 is desired. Control then returns to the step 40. Otherwise, if an ABR is currently active, control passes to a step 44 for determining if the vehicle 10 is traveling downhill. If the vehicle 10 is not traveling downhill, control passes to the step 42 for indicating no snubbing of the service brakes 14 is desired. Otherwise, if the vehicle 10 is traveling downhill, control passes to a step 46 for applying the service brakes 14 to achieve the desired deceleration.

In a step 50, the brake temperatures are determined via the brake temperature sensors 14. If the temperature of any of the service brakes 14 is not above the first predetermined threshold, in a step 52 control returns to the step 40. Otherwise, if the temperature of any of the service brakes 14 in the step 52 is above the first predetermined threshold, control passes to a step 54 for snubbing the service brakes 14 as discussed above.

The brake temperatures are again determined, in a step 56, via the brake temperature sensors 20. If the temperature of any of the service brakes 14 is not above the brake overuse threshold, in a step 60 control returns to the step 40. Otherwise, if the temperature of any of the service brakes 14 in the step 60 is above the brake overuse threshold, control passes to a step 62 for activating the warning indicator 32 and discontinuing snubbing of the service brakes 14.

Reduced braking performance as a result of fade can be measured by the automated braking system by comparing long-term deceleration baselines to the performance of the deceleration in question at that moment. Loss of performance, once other influence like grade are accounted for through a grade sensor or other electronic means in the control unit, can be attributed to brake fade, and can trigger the snubbing mode.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A vehicle braking control system, comprising:
   a vehicle brake associated with a wheel on the vehicle;
   a pedal activated by an operator of the vehicle for controlling application of the brake; and
   an electronic control unit determining a grade mode of the vehicle, the electronic control unit being set to a control unit grade mode based on the vehicle grade mode, the electronic control unit controlling application of the brake independent of the operator activating the pedal while in an automatic braking mode, the electronic control unit sending a control signal to apply the brake in a manner to reduce brake fade while controlling a speed of the vehicle when the electronic control unit is in the automatic braking mode and the electronic control unit is set to a downhill grade mode.

2. The vehicle braking control system as set forth in claim 1, further including:
   a sensor electronically communicating with the electronic control unit, the electronic control unit determining the grade mode as a function of a signal from the sensor indicative of road grade.

3. The vehicle braking control system as set forth in claim 1, wherein:
   the electronic control unit sending the control signal to apply the brake in relatively shorter and relatively higher pressure applications, as compared to a continuous brake application, to reduce the brake fade when the electronic control unit is in the automatic braking mode and the downhill grade mode.

4. The vehicle braking control system as set forth in claim 3, wherein, to reduce the brake fade, the electronic control unit alternately causes the brake to be applied for about ½ second and released for about 1½ seconds at a pressure that is about double a continuous application to achieve the relatively shorter and relatively higher pressure applications.

5. The vehicle braking control system as set forth in claim 1, wherein:
   the electronic control unit sends the control signal to apply the brake in the manner to reduce the brake fade when the electronic control unit enters the automatic braking mode and the electronic control unit is in the downhill grade mode; and
   the electronic control unit sends the control signal to apply the brake in the manner to reduce the brake fade until at least one of the electronic control unit exits the automatic braking mode and the downhill grade mode.

6. The vehicle braking control system as set forth in claim 1, further including:
   a brake temperature sensor electronically communicating with the electronic control unit;
   wherein the electronic control unit sends the control signal to apply the brake in the manner to reduce the brake fade when the electronic control unit receives at least one of a signal from the brake temperature sensor that a temperature of the brake is above a first predetermined threshold and a signal from a sensor indicating the vehicle is in the downhill grade mode; and
   wherein the electronic control unit sends the control signal to apply the brake in the manner to reduce the brake fade until the electronic control unit receives a signal from the brake temperature sensor that a temperature of the brake is above a brake overuse threshold.

7. The vehicle braking control system as set forth in claim 1, wherein:
   when the electronic control unit receives an acceleration request of ≤about −1.2 m/sec$^2$ from an automatic cruise controller, the electronic control unit sends the control signal to apply the brake in the manner to reduce brake fade to control the speed of the vehicle.

8. A vehicle brake controller, comprising:
   an input for receiving a signal indicative of a grade mode of the vehicle; and
   an electronic control unit, determining the grade mode of the vehicle as a function of the signal received from the vehicle sensor, the electronic control unit being set to a control unit grade mode based on the vehicle grade mode, and the electronic control unit controlling application of a vehicle brake while in an automatic braking mode, the electronic control unit sending a control signal to apply the brake in a plurality of shorter and higher pressure applications relative to a continuous application to control a speed of the vehicle while the electronic control unit is in the automatic braking mode and the electronic control unit is set to a downhill grade mode.

9. The vehicle brake controller as set forth in claim 8, further including:
   a forward vehicle sensor electronically communicating with the electronic control unit, the electronic control unit determining a distance to a forward vehicle as a function of a signal from the forward vehicle sensor;
   wherein the electronic control unit sends the control signal to apply the brake in the relatively shorter and the relatively higher pressure applications while the electronic control unit controls the speed of the vehicle to maintain a predetermined distance to the forward vehicle.

10. The vehicle brake controller as set forth in claim 8, wherein the electronic control unit alternately sends the control signal to apply the brake for about ½ second and then stops sending the control signal to released the brake for about 1½ seconds at a pressure that is about double a continuous application to achieve the relatively shorter and relatively higher pressure applications while the electronic control unit is in the automatic braking mode and the electronic control unit is set to the downhill grade mode.

11. The vehicle brake controller as set forth in claim 8, wherein:
   when the electronic control unit receives an acceleration request of ≤about −1.2 m/sec$^2$ from an automatic cruise controller, the electronic control unit sends the control signal to apply the brake in the relatively shorter and the relatively higher pressure applications to control the speed of the vehicle.

12. The vehicle brake controller as set forth in claim 8, further including:
   a brake temperature sensor electronically communicating with the electronic control unit;
   wherein the electronic control unit sends the control signal to apply the brake in the plurality of relatively shorter and the relatively higher pressure applications to control the speed of the vehicle when the electronic control unit receives a signal from the brake temperature sensor that a temperature of the brake is above a first predetermined threshold.

13. The vehicle brake controller as set forth in claim 12, wherein:
   the electronic control unit sends the control signal to apply the brake in the relatively shorter and the relatively higher pressure applications to control the speed of the vehicle until the electronic control unit receives a signal from the brake temperature sensor that a temperature of the brake is above a brake overuse threshold.

14. The vehicle brake controller as set forth in claim 8, wherein:
   the electronic control unit sends the control signal to apply the brake in the relatively shorter and the relatively higher pressure applications to control the speed of the vehicle until the electronic control unit is no longer set to the downhill grade mode based on the signal from the vehicle sensor.

15. A method for controlling a vehicle braking control system, the method comprising:
   determining a grade mode as a function of a signal received by an electronic control unit from a vehicle sensor;
   determining when an automatic braking mode is active; and
   when the grade mode is determined to be downhill and when the automatic braking mode is active, sending a control signal to apply the brake in a manner to reduce brake fade while controlling a speed of the vehicle, the applying the brake in a manner to reduce brake fade including:
      applying the brake in shorter and relative higher pressure applications relative to a continuous application.

16. The vehicle braking control system as set forth in claim 1, wherein:
   the vehicle includes a plurality of additional vehicle brakes associated with respective additional wheels on the vehicle; and
   the electronic control unit sends the control signal to apply all of the brakes in the manner to reduce brake fade while controlling the speed of the vehicle when the electronic control unit is in the automatic braking mode and the vehicle is in the downhill grade mode.

17. The method for controlling a vehicle braking control system as set forth in claim 15, further including:
   continuing to send the control signal to apply the brake in a manner to reduce brake fade until at least one of the grade mode is determined to not be downhill and the temperature of the brake is above a brake overuse threshold.

18. The method for controlling a vehicle braking control system as set forth in claim 15, further including:
   determining a temperature of the brake as a function of a signal received by the electronic control unit from a temperature sensor; and
   when the temperature of the brake is above a first predetermined threshold, sends the control signal to apply the brake in a manner to reduce brake fade while controlling the speed of the vehicle.

* * * * *